US009637008B2

(12) United States Patent
Sonoda et al.

(10) Patent No.: US 9,637,008 B2
(45) Date of Patent: May 2, 2017

(54) GENERATOR MOTOR UNIT, POWER OUTPUT ENGINE, AND VEHICLE

(71) Applicant: HONDA MOTOR CO., LTD., Tokyo (JP)

(72) Inventors: Yutaka Sonoda, Wako (JP); Tatsuya Shiozawa, Wako (JP); Katsuhiro Ouchi, Wako (JP); Takeshi Yanagisawa, Wako (JP); Ryota Takagi, Wako (JP); Atsushi Katayama, Wako (JP); Hitoshi Kurosaka, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 49 days.

(21) Appl. No.: 14/772,449

(22) PCT Filed: Dec. 10, 2013

(86) PCT No.: PCT/JP2013/083079
§ 371 (c)(1),
(2) Date: Sep. 3, 2015

(87) PCT Pub. No.: WO2014/136343
PCT Pub. Date: Sep. 12, 2014

(65) Prior Publication Data
US 2016/0009185 A1 Jan. 14, 2016

(30) Foreign Application Priority Data

Mar. 8, 2013 (JP) .................................. 2013-046997

(51) Int. Cl.
*B60L 9/00* (2006.01)
*B60L 11/00* (2006.01)
(Continued)

(52) U.S. Cl.
CPC ................ *B60L 11/14* (2013.01); *B60K 6/26* (2013.01); *B60K 6/448* (2013.01); *B60K 6/485* (2013.01);
(Continued)

(58) Field of Classification Search
USPC ............. 701/1, 22; 180/65.265; 290/1 R, 31; 310/198; 903/906, 930
See application file for complete search history.

(56) References Cited

U.S. PATENT DOCUMENTS 5,530,309 A * 6/1996 Weldon .................. H02K 31/02
310/178
5,988,307 A * 11/1999 Yamada .................. B60K 6/26
180/243
(Continued)

FOREIGN PATENT DOCUMENTS

CN 2640115 Y 9/2004
DE 43 18 949 C1 6/1994
(Continued)

OTHER PUBLICATIONS

Japanese Notice of Allowance with English Translation dated May 17, 2016, 6 pages.
(Continued)

*Primary Examiner* — Ronnie Mancho
(74) *Attorney, Agent, or Firm* — Rankin, Hill & Clark LLP

(57) ABSTRACT

A generator motor unit includes a generator motor including a rotor equipped with magnets, and magnetic bodies that protrude from a wall surface, a first stator that makes magnetic flux act on the magnets, thereby generating torque in the rotor, and a second stator that makes magnetic flux act on the magnetic bodies, thereby generating torque in the
(Continued)

rotor; and a controller that controls energization of coils of the first stator and the second stator.

13 Claims, 11 Drawing Sheets

(51) Int. Cl.

| | | |
|---|---|---|
| *G05D 1/00* | (2006.01) | |
| *G05D 3/00* | (2006.01) | |
| *G06F 7/00* | (2006.01) | |
| *G06F 17/00* | (2006.01) | |
| *B60L 11/14* | (2006.01) | |
| *B60K 6/485* | (2007.10) | |
| *H02K 16/04* | (2006.01) | |
| *B60L 15/20* | (2006.01) | |
| *H02K 7/18* | (2006.01) | |
| *B60K 6/26* | (2007.10) | |
| *B60L 7/00* | (2006.01) | |
| *B60W 10/06* | (2006.01) | |
| *B60W 10/08* | (2006.01) | |
| *B60W 20/10* | (2016.01) | |
| *F02N 11/08* | (2006.01) | |
| *H02K 3/28* | (2006.01) | |
| *B60K 6/448* | (2007.10) | |
| *B60L 7/14* | (2006.01) | |
| *B60L 11/08* | (2006.01) | |
| *B60L 11/18* | (2006.01) | |
| *B60L 15/00* | (2006.01) | |
| *B60L 15/38* | (2006.01) | |
| *F02N 11/00* | (2006.01) | |
| *H02K 11/04* | (2016.01) | |
| *H02K 21/16* | (2006.01) | |
| *H02K 21/22* | (2006.01) | |
| *H02K 19/10* | (2006.01) | |

(52) U.S. Cl.
CPC ............... *B60L 7/006* (2013.01); *B60L 7/14* (2013.01); *B60L 11/08* (2013.01); *B60L 11/1803* (2013.01); *B60L 15/007* (2013.01); *B60L 15/2009* (2013.01); *B60L 15/2054* (2013.01); *B60L 15/38* (2013.01); *B60W 10/06* (2013.01); *B60W 10/08* (2013.01); *B60W 20/10* (2013.01); *F02N 11/006* (2013.01); *F02N 11/08* (2013.01); *H02K 3/28* (2013.01); *H02K 7/1815* (2013.01); *H02K 11/048* (2013.01); *H02K 16/04* (2013.01); *B60K 2006/264* (2013.01); *B60L 2200/12* (2013.01); *B60L 2200/16* (2013.01); *B60L 2210/42* (2013.01); *B60L 2220/14* (2013.01); *B60L 2220/42* (2013.01); *B60L 2220/52* (2013.01); *B60L 2220/54* (2013.01); *B60L 2220/56* (2013.01); *B60L 2220/58* (2013.01); *B60L 2240/423* (2013.01); *B60L 2260/26* (2013.01); *B60W 2710/0677* (2013.01); *B60W 2710/083* (2013.01); *H02K 19/103* (2013.01); *H02K 21/16* (2013.01); *H02K 21/22* (2013.01); *Y02T 10/6226* (2013.01); *Y02T 10/641* (2013.01); *Y02T 10/645* (2013.01); *Y02T 10/70* (2013.01); *Y02T 10/7077* (2013.01); *Y02T 10/72* (2013.01); *Y02T 10/7275* (2013.01); *Y10S 903/906* (2013.01); *Y10S 903/93* (2013.01)

(56) References Cited

U.S. PATENT DOCUMENTS

| | | | |
|---|---|---|---|
| 2003/0052564 A1* | 3/2003 | Wilsdorf | H01R 39/24 310/179 |
| 2008/0246363 A1 | 10/2008 | Atarashi et al. | |
| 2009/0235883 A1* | 9/2009 | Watanabe | F01L 1/352 123/90.15 |
| 2011/0253085 A1* | 10/2011 | Kokubo | F01L 1/352 123/90.17 |
| 2014/0062236 A1* | 3/2014 | Taniguchi | H02K 3/28 310/71 |
| 2015/0318772 A1* | 11/2015 | Jahshan | H02P 23/00 318/400.41 |
| 2016/0009185 A1* | 1/2016 | Sonoda | B60K 6/485 701/22 |

FOREIGN PATENT DOCUMENTS

| | | |
|---|---|---|
| DE | 693 13 744 T2 | 4/1998 |
| DE | 100 27 360 A1 | 12/2000 |
| DE | 199 60 168 A1 | 6/2001 |
| DE | 101 10 903 A1 | 10/2001 |
| EP | 2 020 334 A2 | 2/2009 |
| EP | 2 022 662 A1 | 2/2009 |
| EP | 2 061 146 A1 | 5/2009 |
| EP | 2 139 106 A1 | 12/2009 |
| JP | 07-075212 | 3/1995 |
| JP | 3211702 | 7/2001 |
| JP | 2008-259303 | 10/2008 |
| JP | 4410680 | 11/2009 |
| JP | 2010-098853 | 4/2010 |
| JP | 2010-208485 | 9/2010 |
| JP | 2010-223136 | 10/2010 |
| JP | 2012-165577 | 8/2012 |

OTHER PUBLICATIONS

International Search Report, Date of mailing: Mar. 18, 2014 (Mar. 18, 2014).
European Search Report dated Dec. 9, 2016.

\* cited by examiner

GENERATOR MOTOR UNIT, POWER OUTPUT ENGINE, AND VEHICLE

TECHNICAL FIELD

The present invention relates to a generator motor unit, a power output engine, and a vehicle.

Priority is claimed on Japanese Patent Application No. 2013-046997, filed Mar. 8, 2013, the contents of which are incorporated herein by reference.

BACKGROUND ART

In the related art, starting power-generating systems having a starter generator, which functions as a starter motor at the time of starting an engine and that functions as a generator and charges a battery after the engine is started, are known (for example, refer to Patent Document 1). A motor in which the generator and the starter motor are integrated in this way may be referred to as an alternating current generator (ACG) starter. The ACG starter is installed coaxially with, for example, a crankshaft that is a rotation output shaft of the engine, and a rotor is coupled to the crankshaft. By using the ACG starter, the need for including a related-art cell motor type starter disappears. For this reason, weight and costs can be reduced, and generation of noise caused by a reduction gear that couples the cell motor type starter and the crankshaft together can be eliminated. Additionally, in vehicles that perform idling stop, which have recently been become more common, the ACG starter is preferably used.

PRIOR ART DOCUMENTS

Patent Documents

Patent Document 1: Japanese Patent No. 4410680
Patent Document 2: Japanese Unexamined Patent Application, First Publication No. 2010-223136

SUMMARY OF INVENTION

Problems to be Solved by the Invention

The ACG starter is coupled to the crankshaft without being coupled via the reduction gear. Therefore, a method by which to make enough torque act on the crankshaft to overcome compression occurring on a top dead center of the engine at the time of starting the engine has become an issue. This is because, if a large-scale starter is used as the ACG starter, friction may become large at the time of normal traveling and comfort during traveling or fuel consumption may be degraded.

Patent Document 2 discloses an engine starting control device that reversely rotates the rotation position of an engine to a predetermined position after a compression top dead center at the time of engine stoppage during idling stop control and that gives a traveling assisting period until the compression top dead center is reached to the engine. Such control may be referred to as swing-back. Additionally, means (decompressor) for opening an exhaust valve by a given amount at the time of starting the engine and reducing a force required to overcome compression occurring on the top dead center is known as another technique. However, some studies regarding the properties (torque output performance or power generation properties) of the ACG starter which do not depend on the swing-back and the decompressor or while complementing these controls are expected.

Aspects of the invention have been made in consideration of such circumstances, and an object thereof is to provide a generator motor capable of imp는 roving torque output performance while limiting an increase in friction.

Means For Solving the Problems

The following configurations are adopted in the generator motor unit related to the invention in order to solve the above problems.

(1) A generator motor unit related to an aspect of the invention includes a generator motor including a rotor provided with magnets, and magnetic bodies that protrude from a wall surface, a first stator that makes magnetic flux act on the magnets, thereby generating torque in the rotor, and a second stator that makes magnetic flux act on the magnetic bodies, thereby generating torque in the rotor and that is provided with a switching part capable of stopping energization of coils configured to generate the magnetic flux; and a controller that performs energization of coils of the first stator and the second stator so that magnetic flux is generated in the first stator and the second stator when the torque is generated in a rotation direction of the rotor and that performs energization of the coils of the first stator so that magnetic flux is generated in the first stator and stops energization of the coils of the second stator in a state in which the switching part is brought into an OFF state, when electric power is generated by an action of electromagnetic induction caused by a rotation of the rotor.

(2) In the above aspect (1), the magnets may be arranged at an inner peripheral surface of a substantially cylindrical member in the rotor, the first stator may make magnetic flux act on the magnets from a radial inward direction of a substantially cylindrical member, the magnetic bodies may be arranged at an outer peripheral surface of the substantially cylindrical member in the rotor, and the second stator may make magnetic flux act on the magnetic bodies from a radial outward direction of the substantially cylindrical member.

(3) In the above aspect (2), the magnets and the magnetic bodies may be respectively arranged on an inner peripheral surface and an outer peripheral surface of the same substantially cylindrical member in the rotor.

(4) In the above aspect (3), the magnet may be arranged at intervals in a circumferential direction of the substantially cylindrical shape, and the magnetic flux generated by the first stator and the second stator may pass between the magnets.

(5) In the above aspect (1), the rotor may include a first cylindrical member and a second cylindrical member that have an axis in common, the magnets may be arranged on an inner peripheral surface of one of the first cylindrical member and the second cylindrical member, and the magnetic bodies may be arranged on an outer peripheral surface of the other of the first cylindrical member and the second cylindrical member.

(6) In the above aspect (1), the magnets may be arranged at an outer peripheral surface of a substantially cylindrical member in the rotor, the first stator may make magnetic flux act on the magnets from a radial outward direction of the substantially cylindrical member, the magnetic bodies may be arranged at an inner peripheral surface of the substantially cylindrical member in the rotor, and the second stator may make magnetic flux act on the magnetic bodies from a radial inward direction of the substantially cylindrical member.

(7) A power output engine related to another aspect of the invention includes the generator motor unit of the above (1); and an internal combustion engine that outputs rotational driving power. The rotor is coupled to a rotation output shaft of the internal combustion engine.

(8) In the above aspect (7), the controller may perform energization of coils of the first stator and the second stator so that magnetic flux is generated in the first stator and the second stator when the internal combustion engine is started, and may perform energization of the coils of the first stator so that magnetic flux is generated in the first stator and may stop energization of the coils of the second stator in a state in which the switching part is brought into an OFF state, when electric power is generated using power output from the internal combustion engine.

(9) In the power output engine of the above (7) or the above (8), the second stator may be fixed to a cover portion of the internal combustion engine.

(10) A vehicle related to still another aspect of the invention is a vehicle including the power output engine of the above (7); and an acceleration control mechanism. The controller performs energization of the coils of the second stator, thereby generating a positive torque in a rotation direction of the rotor, when the acceleration control mechanism is operated.

(11) A vehicle related to still another aspect of the invention is a vehicle including the power output engine of the above (7) or the above (8); and a deceleration control mechanism. The controller performs energization of the coils of the second stator, thereby generating a negative torque in a rotation direction of the rotor, when the deceleration control mechanism is operated.

Advantageous Effects of Invention

According to the above aspects (1), (7), and (8), the torque output performance can be improved while limiting an increase in friction.

According to the above aspect of (10), excellent acceleration ability can be obtained.

According to the above aspect of (11), excellent braking performance can be obtained.

DESCRIPTION OF EMBODIMENTS

Hereinafter, embodiments of a generator motor, a generator motor unit, and a power output engine of the invention will be described with reference to the drawings.

First Embodiment

[Configuration of Motorcycle]

Figure 1:
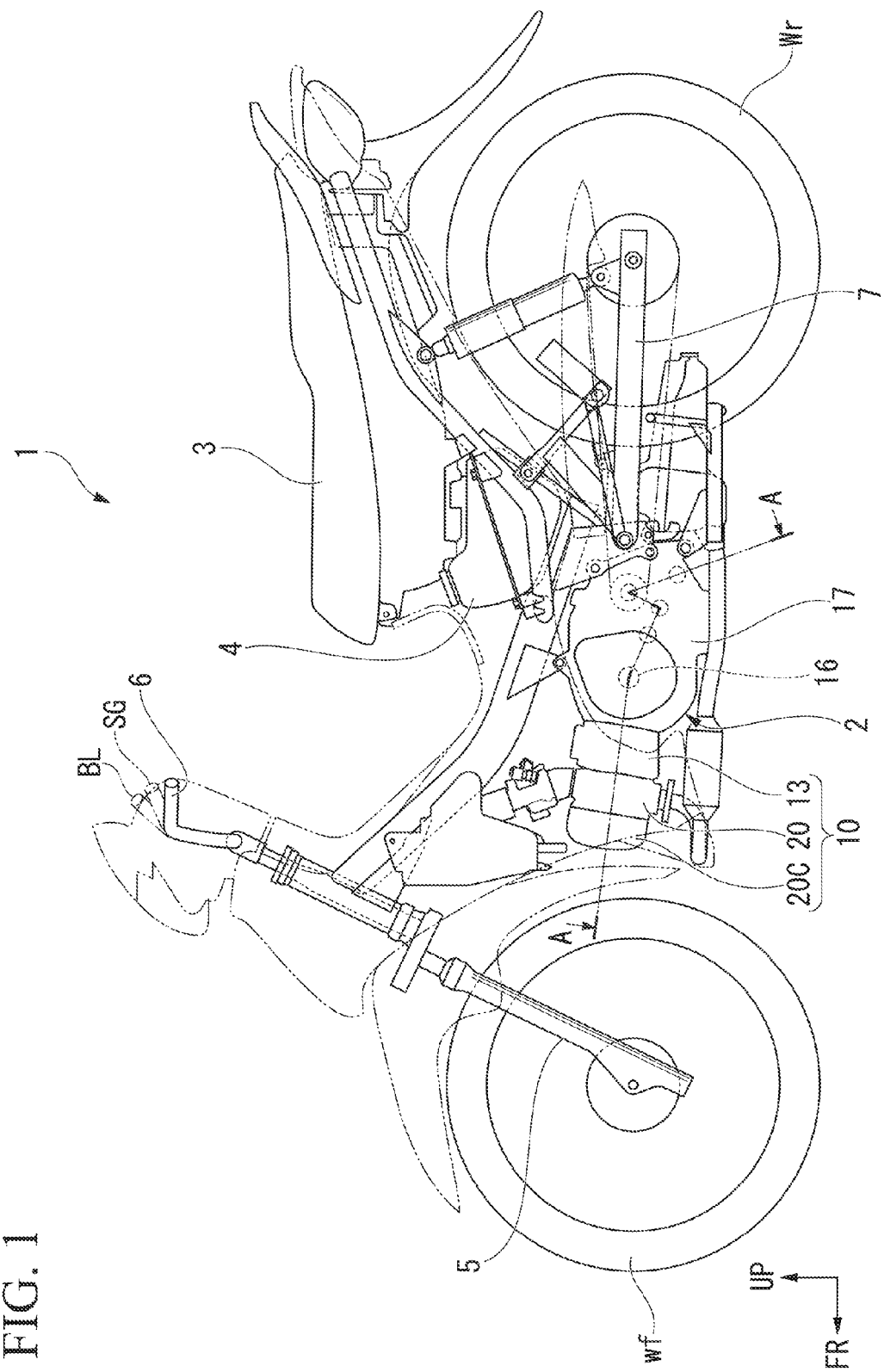
FIG. 1 is a configuration view showing an example of an overall configuration of a motorcycle in which an ACG starter (generator motor) related to embodiments of the invention is mounted.

FIG. 1 is a configuration view showing an example of an overall configuration of a motorcycle 1 on which an ACG starter (generator motor) 60 related to the embodiments of the invention is mounted. In the motorcycle 1, an engine unit 2 is mounted at the center in a vehicle body front-rear direction, a seat 3 on which an occupant sits down is provided above a rear portion of the engine unit 2, and a fuel tank 4 is provided below the seat 3.

A front wheel Wf is rotatably supported by a front fork 5. A steering handle 6 is provided at an upper portion of the front fork 5. A brake lever BL and a throttle grip SG are arranged on the right side of the steering handle 6. Additionally, a rear wheel Wr is swingably supported by a vehicle body frame via a swing arm 7.

Figure 2:
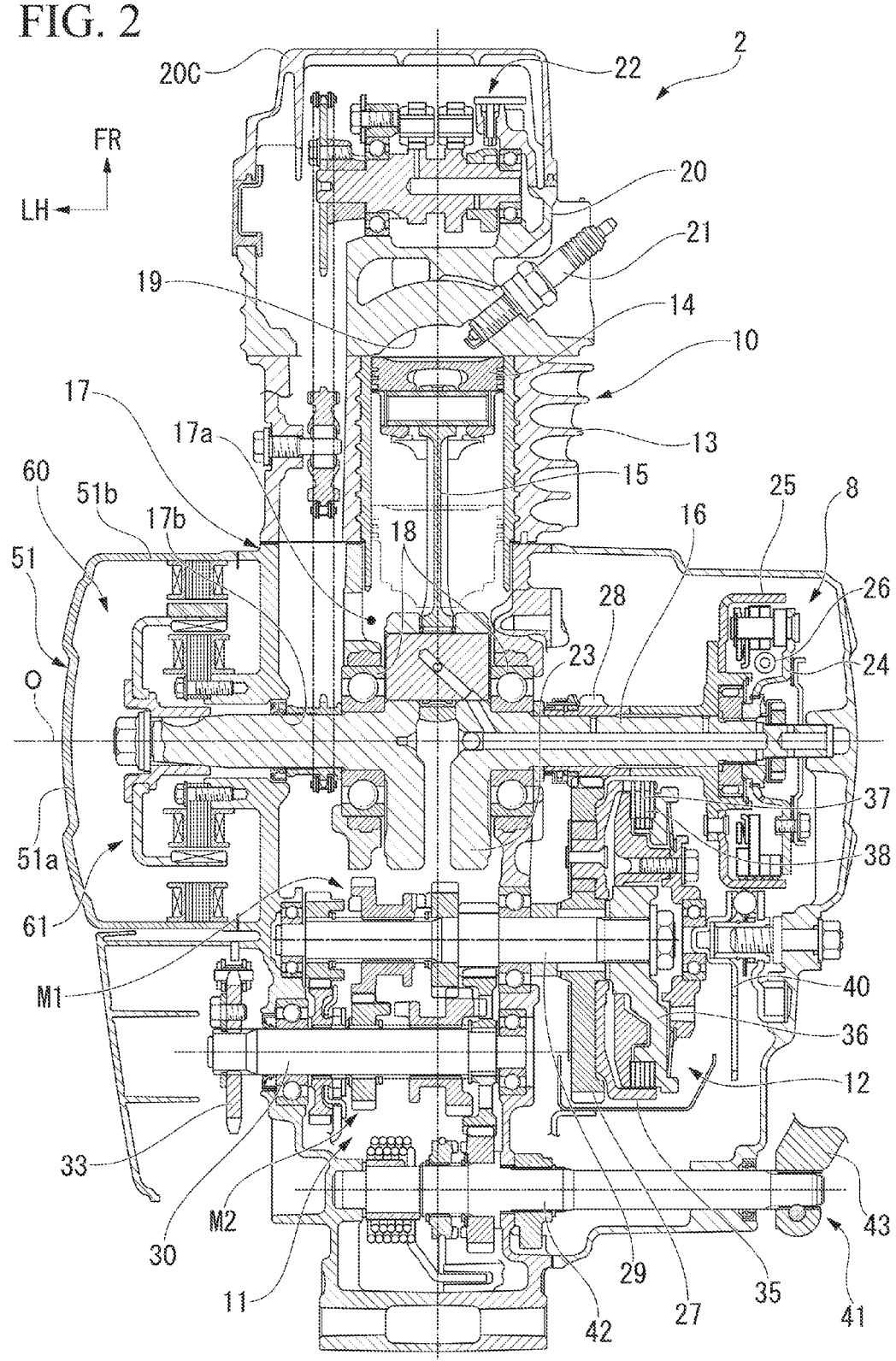
FIG. 2 is a developed cross-sectional view of an engine unit corresponding to an A-A cross-section of FIG. 1.

FIG. 2 is a developed cross-sectional view of the engine unit 2 corresponding to an A-A cross-section of FIG. 1. In the engine unit 2, a reciprocal engine 10 that is an internal combustion engine, and a multistage transmission 11 are constituted as an integral block. The engine 10 and the transmission 11 are configured so that power can be transmitted via a centrifugal clutch 8 and a transmission clutch 12.

In the engine 10, a piston 14 is slidably fitted into a cylinder bore of a cylinder block 13. The piston 14 is coupled to a crankshaft 16 via a connecting rod 15. The engine 10, as shown in FIG. 1, is mounted on a vehicle in a substantially horizontal posture in which the cylinder block 13 extends to the front of the vehicle body with respect to the crankshaft 16.

The crankshaft 16 is rotatably supported via a bearing 18 to a crankcase 17 which is combined with a base end portion of the cylinder block 13. Additionally, a cylinder head 20 that forms a combustion chamber 19 between the cylinder head and the piston 14 is attached to a tip portion of the cylinder block 13.

In addition, reference sign 21 in FIG. 2 represents an ignition device that is installed in the cylinder head 20 so as to face the inside of the combustion chamber 19. Additionally, reference sign 22 represents a valve gear that is provided on a tip side of the cylinder head 20 to drive the opening and closing of an intake/exhaust valve (not shown) while interlocking with the crankshaft 16, and is covered with a head cover 20C. Additionally, reference sign 23 of FIG. 2 represents crank webs provided on both sides in an axial direction of a coupling portion (crankpin) with the connecting rod 15 on the crankshaft 16. Additionally, reference sign 17a represents a crank chamber within a crankcase 17 that houses substantially the entire region of the crankshaft 16.

The centrifugal clutch 8 is provided at the outer periphery (the outer periphery closer to the outer side in the axial direction than the crank webs 23) of one end portion (an end portion on the right side of a paper surface of FIG. 2, hereinafter referred to as a right end portion) of the crankshaft 16 in the axial direction. The centrifugal clutch 8 is equipped with an inner clutch 24 that is integrally fixed to the right end portion of the crankshaft 16, an outer clutch 25 that is rotatably supported by the outer periphery of the right end portion of the crankshaft 16, and a centrifugal weight 26 that rotates integrally with the inner clutch 24 and brings the inner clutch 24 and the outer clutch 25 into a connected state due to a centrifugal force. The centrifugal clutch 8 outputs the rotational power of the crankshaft 16 to the outer clutch 25 when the rotating speed of the crankshaft 16 reaches a predetermined speed or higher.

Additionally, an output gear 28, which meshes with an input gear 27 integrated with the transmission clutch 12, is integrally rotatably combined with the outer clutch 25. A main shaft 29 and a counter shaft 30 of the transmission 11 are provided parallel to the crankshaft 16 at positions closer to the vehicle rear side than a rotation center O of the crankshaft 16 within the crankcase 17.

The main shaft 29 and the counter shaft 30 are rotatably supported within the crankcase 17 via a pair of bearings, which are arranged apart from each other, respectively. Additionally, the main shaft 29 is arranged at a position adjacent to the vehicle rear side of the crankshaft 16, and the counter shaft 30 is arranged at a position adjacent to the vehicle rear side of the main shaft 29.

A main shift gear group M1 is disposed on the main shaft 29 of the transmission 11. A counter gear group M2 that meshes with a main gear group M1 is disposed on the counter shaft 30. The input gear 27 meshing with the output gear 28 on the crankshaft 16 side and the transmission clutch 12 are provided at one end portion (an end portion on the right side of the paper surface of FIG. 2, hereinafter referred to as a right end portion) of the main shaft 29 in the axial direction.

The input gear 27 is rotatably supported on the outer periphery of the main shaft 29. Additionally, an output sprocket 33 is attached to the other end portion (an end portion on the left side of the paper surface of FIG. 2) of the counter shaft 30 in the axial direction. A chain for power transmission (not shown) is hung around on the output sprocket 33, and the rotation of the counter shaft 30 is transmitted to the rear wheel Wr that is a driving wheel via the chain.

In the transmission 11, a driving transmission gear of the main gear group Ml and the counter gear group M2 is selected by the rotational operation of a shift drum (not shown) provided within the crankcase 17, and thereby, an arbitrary shift gear stage (gear position) that includes neutral is set.

The transmission clutch 12 is equipped with an outer clutch 35, the inner clutch 36, a plurality of driving friction plates 37, a plurality of driven friction plates 38, a clutch spring (not shown), and an operating plate 40. The outer clutch 35 has a bottomed cylindrical shape that is rotatably supported on the main shaft 29 in a state in which the outer clutch is combined integrally with the input gear 27. The inner clutch 36 has a substantially disc-like shape that is spline-fitted to the main shaft 29. The plurality of driving friction plates 37 are integrally rotatably locked to the outer clutch 35. The plurality of driven friction plates 38 are integrally rotatably locked to the inner clutch 36 and come into frictional contact with the driving friction plates 37. The clutch spring biases the driving friction plates 37 and the driven friction plates 38 in a pressure contact direction. The operation panel 40 operates to release the biasing force of the clutch spring that acts between the driving friction plates 37 and the driven friction plates 38.

The driving friction plates 37 on the outer clutch 35 side and the driven friction plates 38 on the inner clutch 36 side are arranged alternately in the axial direction, and are pressed against each other under the biasing force of the clutch spring. Accordingly, the power transmission between the outer clutch 35 and the inner clutch 36 becomes possible. Additionally, by operating to release the biasing force of the clutch spring using the operating plate 40, the power transmission between the inner clutch 36 the outer clutch 35 is cut off.

In the present embodiment, the operating plate 40 is configured so as to be movable back and forth in the axial direction while interlocking with the operation of a shift pedal (not shown). When the shift pedal is operated, the operating plate 40 releases the biasing force of the clutch spring that acts between the driving friction plates 37 and the driven friction plates 38 for a predetermined period before a shift gear meshes therewith, and thereby stops the power transmission between the outer clutch 35 and the inner clutch 36. After the meshing of the shift gear, a state in which the driving friction plates 37 and the driven friction plates 38 mesh with each other is brought about.

Additionally, a kick spindle 42 of a kick starter 41 is rotatably attached to a lower side of a rear portion of the crankcase 17. The kick spindle 42 transmits its rotation to the crankshaft 16 only when the kick pedal 43 is stepped on.

Meanwhile, the other end portion (an end portion on the left side of the paper surface of FIG. 2, hereinafter referred to as a left end portion) of the crankshaft 16 in the axial direction passes through a circular opening 17b formed in a side wall (wall portion) of the crankcase 17 and protrudes to the outside from the side wall of the crankcase 17. An ACG starter 60, which also serves as an AC generator and a starting motor of the engine 10, is attached to a left end portion side of the crankshaft 16 protruding from the opening 17b of the crankcase 17. Additionally, the left end portion of the crankshaft 16 is covered with a concave engine cover 51 attached to the side wall of the crankcase 17 by being fastened with a bolt or the like.

The engine cover 51 is equipped with a bottom wall portion 51a and a side wall portion 51b (cover portion). The bottom wall portion 51a covers the left end portion of the crankshaft 16 from the left side. The side wall portion 51b extends so as to rise from an outer peripheral edge of the bottom wall portion 51a, abuts against the side wall of the crankcase 17 at the tip thereof, and is combined with the crankcase 17.

[Configuration and Control of ACG Starter]

Figure 3:
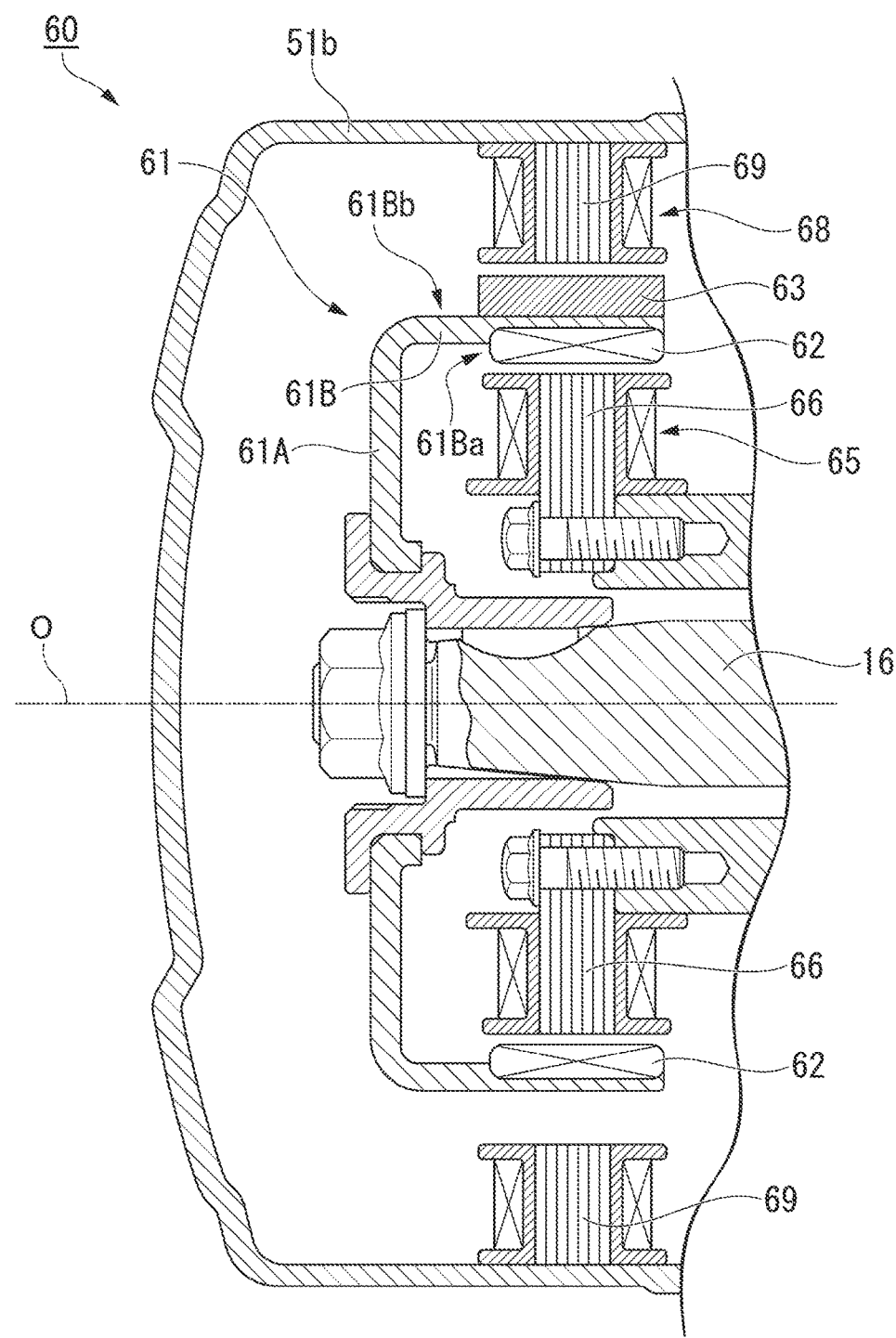
FIG. 3 shows an example of a cross-sectional view of an ACG starter related to a first embodiment.
Figure 4:
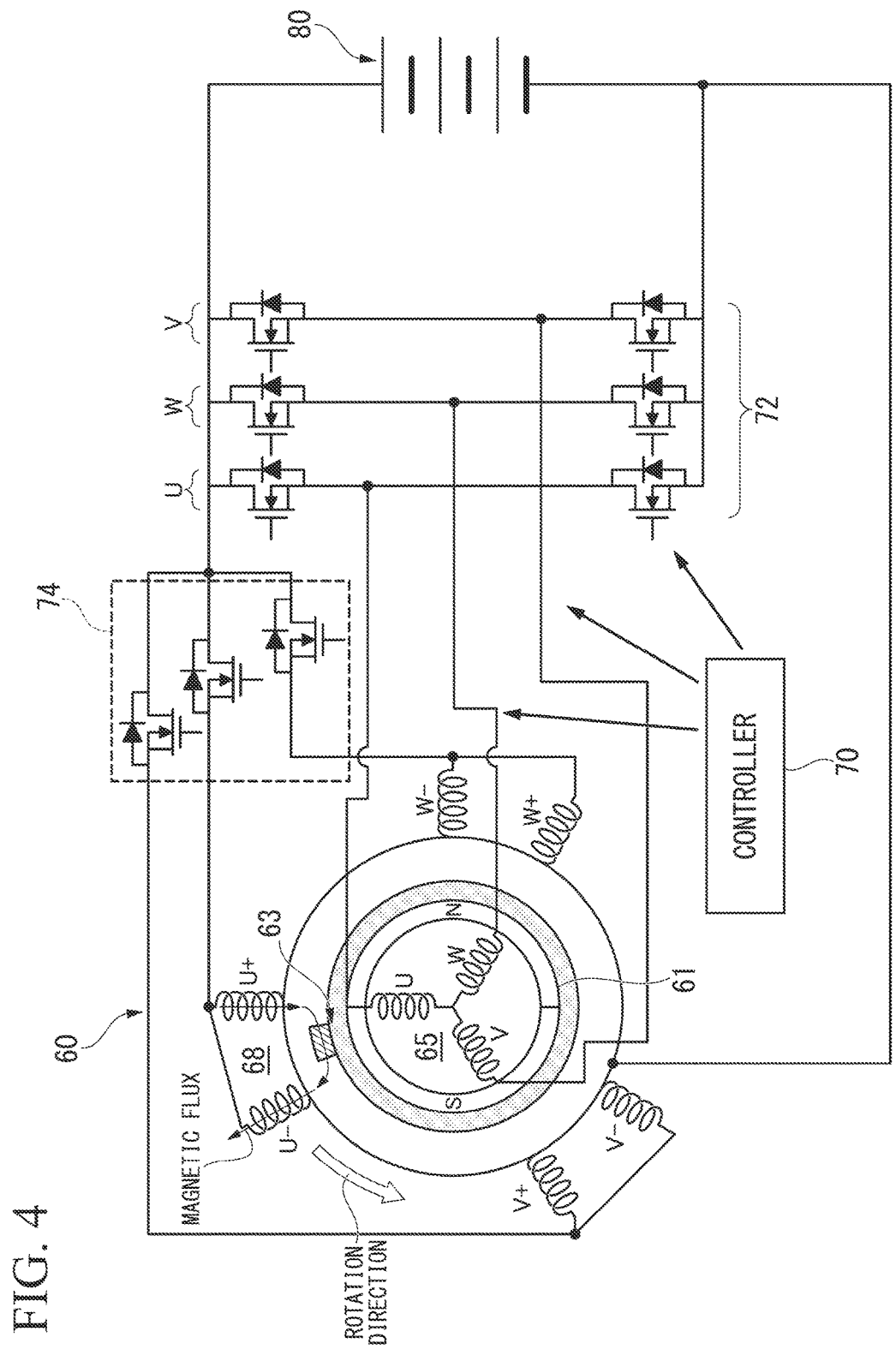
FIG. 4 is a model view of a generator motor unit related to the first embodiment.

FIG. 3 shows an example of a cross-sectional view of the ACG starter 60 related to the first embodiment. Additionally, FIG. 4 is a model view of a generator motor unit related to the first embodiment.

The ACG starter 60 is a switching element group which is driven by a controller 70. The ACG starter 60 is controlled by a switching element group 72 connected to a first stator 65, and a switching element group (switching part) 74 connected to a second stator 68. Arbitrary types of switches, such as a transistor, an integrated circuit (IC), and a semiconductor switch, may be used for each switching element group. The controller 70 is, for example, a microcomputer centered on a central processing unit (CPU). The battery 80 supplies electric power for driving the ACG starter 60 or electric power configured to allow other electrical components (for example, a head lamp or the like) to operate, and is charged with the electric power generated by the ACG starter 60.

The controller 70 applies pulse width modulation (PWM) signals to gate terminals of switching elements of respective phases in the switching element group 72 according to the rotational angle of the rotor 61, and rotates the rotor 61. Additionally, the controller 70 applies a signal according to the rotational angle of the rotor 61 to the switching element group 74, and assists in the rotation of the rotor 61.

Figure 5:
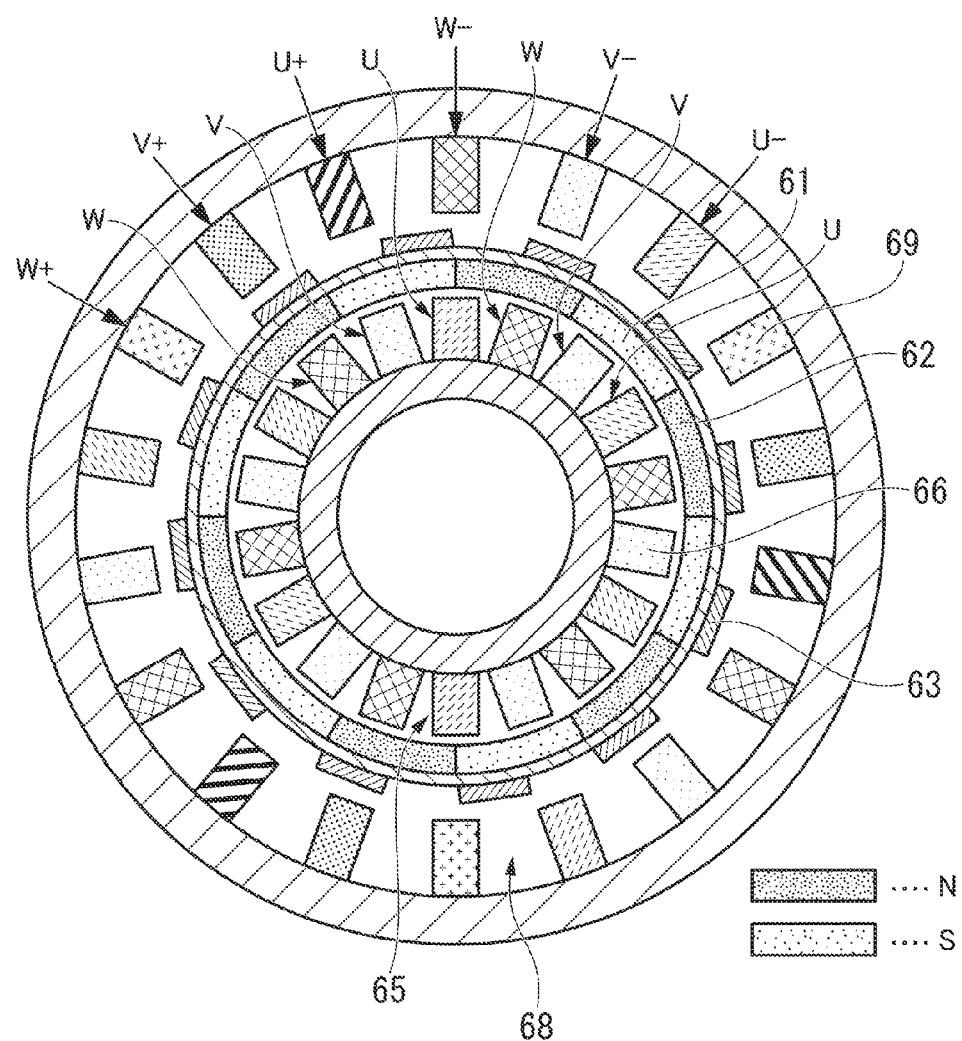
FIG. 5 is a plan view of the ACG starter related to the first embodiment seen from the engine side.

FIG. 5 is a plan view of the ACG starter 60 related to the first embodiment seen from the engine 10 side. Magnets 62 represented by "S" in FIG. 5 are magnets in which a radial inner side is an S pole and a radial outer side is an N pole. Additionally, the magnets 62 represented by "N" in FIG. 5 are magnets in which a radial inner side is an N pole and a radial outer side is an S pole.

The ACG starter 60 is equipped with the rotor 61 that rotates integrally with the crankshaft 16, the first stator 65, and the second stator 68.

The rotor 61 has a substantially cylindrical shape, a bottom wall portion 61A forms a disk surface, and an opening is formed on a side opposite to the bottom wall portion 61A through which the crankshaft 16 is introduced. The magnets 62 are attached or formed on an inner peripheral surface 61Ba of a side wall portion 61B of the rotor 61 so as to cover the inner peripheral surface 61Ba from the inside. Magnetic bodies 63 are attached to or formed on an outer peripheral surface 61Bb of the side wall portion 61 B of the rotor 61 so as to protrude from an outer peripheral surface 61Bb (wall surface). The magnetic bodies 63 are provided so as to protrude inward or outward from an outer peripheral surface 61Bb.

The first stator 65, for example, is coupled to the crankcase 17, and is housed inside the rotor 61 in a radial direction. The first stator 65 is equipped with a plurality of external-teeth-shaped stator cores 66 that protrude in the direction of the rotor 61 and around which coils are wound. The stator cores 66 make magnetic flux, which is generated by performing energization of the coils, act on the magnets 62, thereby generating torque in the rotor 61. Additionally, the first stator 65 generates electric power through the action of electromagnetic induction caused by the rotation of the rotor 61 accompanying the traveling of the motorcycle 1. The electric power generated from the first stator 65 is stored in a battery 80 (to be described below).

The second stator 68, for example, is coupled to the side wall portion 51b of the engine cover 51 and is installed outside the rotor 61 in the radial direction. The second stator 68 is equipped with a plurality of internal-teeth-shaped stator cores 69 that protrude in the direction of the rotor 61 and around which coils are wound. The second stator 68 makes magnetic flux, which is generated by performing energization of the coils, act on the magnetic bodies 63, thereby generating torque in the rotor 61.

As shown in FIG. 5, the first stator 65 has a structure in which the stator cores 66 have, for example, eighteen poles, and a U pole, a V pole, and W pole are sequentially arranged one by one. The first stator 65 makes magnetic flux act on the magnets 62 arranged on the rotor 61 through well-known three-phase control, and generates torque in the rotor 61.

Additionally, the second stator 68 has a structure in which the stator cores 69 have, for example, eighteen poles, and three sets of stator cores 69 are arranged side by side in a circumferential direction in order of a U+ pole, a V+ pole, a W+ pole, a U− pole, a V− pole, and a W− pole. The second stator 68 generates magnetic flux from the U+ pole toward the U− pole, from the V+ pole toward the V− pole, and from the W+ pole toward the W− pole, and makes the magnetic flux act on the magnetic bodies 63, thereby generating torque in the rotor 61.

Figure 6:
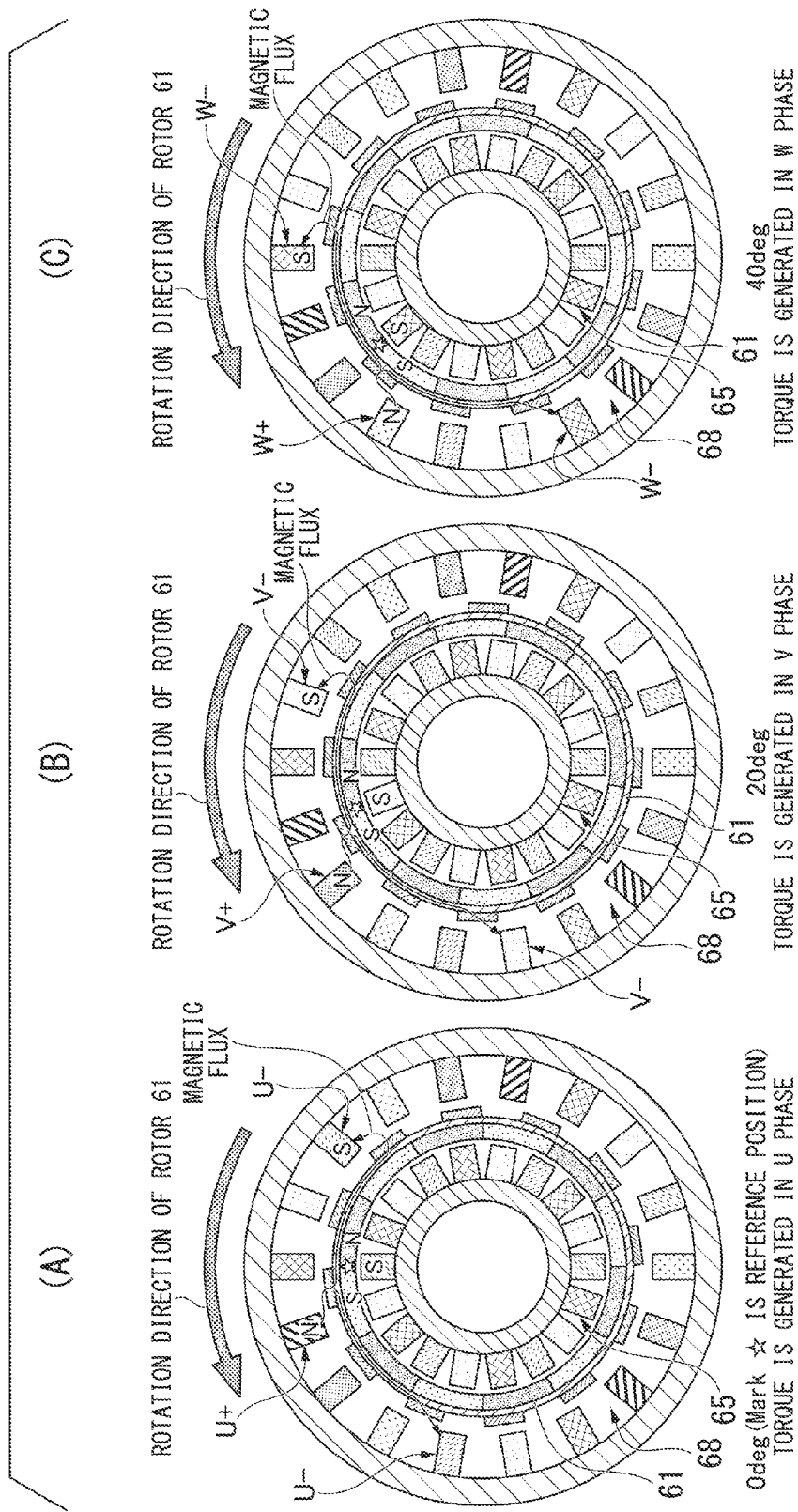
FIG. 6 is a view schematically showing that a rotor is rotationally driven by performing three-phase control of a first stator and a second stator.

FIGS. 6(A) to 6(C) are views schematically showing that the rotor 61 is rotationally driven by performing the three-phase control of the first stator 65 and the second stator 68. In the example of FIG. 6, respective phases of the second stator 68 are arranged such that the respective phases of the second stator advance 20 [deg] more than respective phases of the first stator in the rotation direction of the rotor 61. As shown in FIG. 6(A), when the rotational angle of the rotor 61 is 0 [deg] (reference position), the U-phase stator cores 66 and 69 are energized. As shown in FIG. 6(B), when the rotational angle of the rotor 61 is 20 [deg], the V-phase stator cores 66 and 69 are energized. As shown in FIG. 6(C), when the rotational angle of the rotor 61 is 40 [deg], the W-phase stator cores 66 and 69 are energized. The first stator 65 applies torque so as to push the rotor 61 in the rotation direction, and the second stator 68 applies torque so as to pull the rotor 61 in the rotation direction.

Second Embodiment

Figure 7:
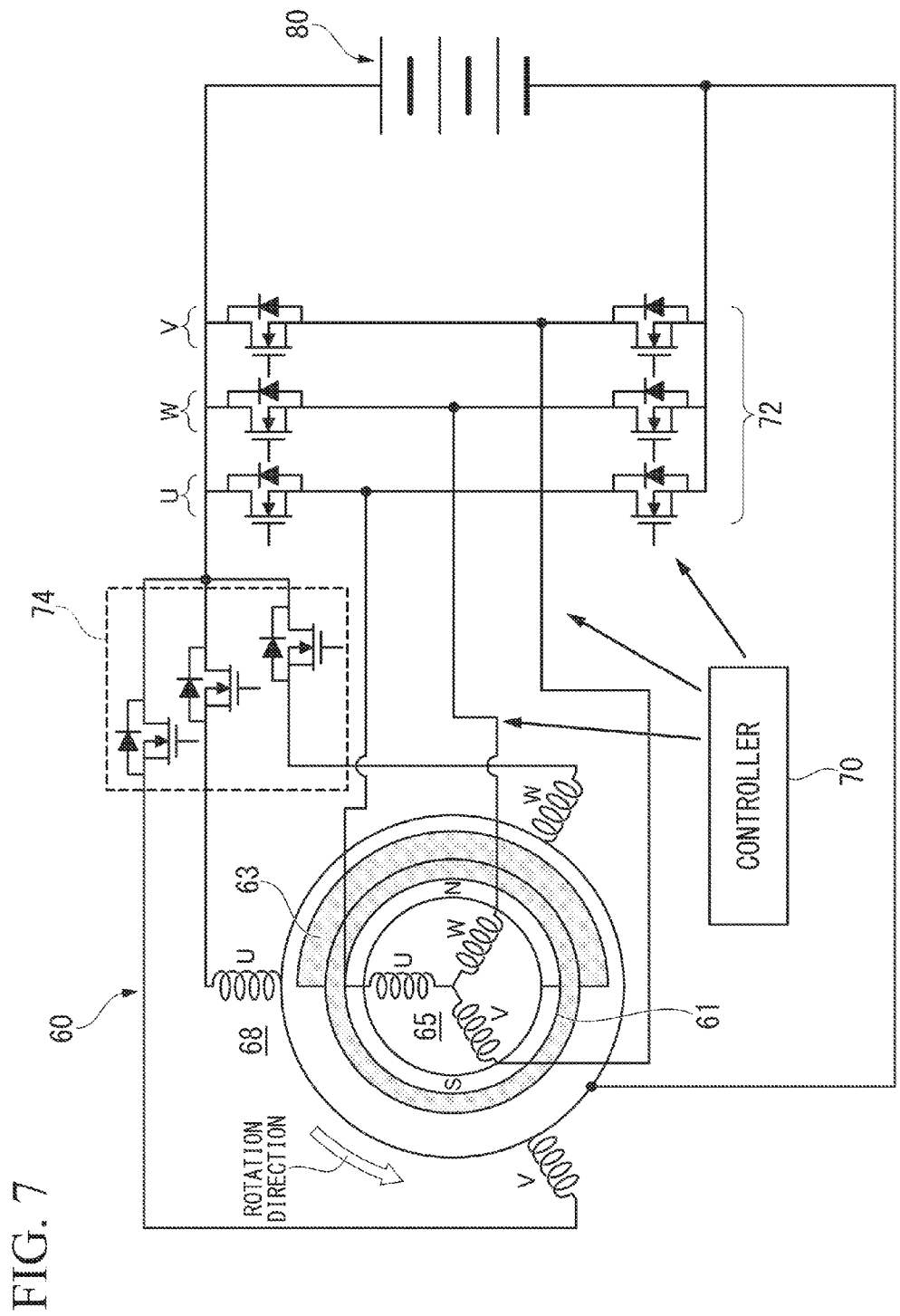
FIG. 7 is a model view of a generator motor unit related to a second embodiment.

FIG. 7 is a model view of a generator motor unit related to a second embodiment. In the generator motor unit related to the second embodiment, the magnets 62 are arranged with interval of certain degrees in the circumferential direction of the rotor 61. Provided is a structure in which the magnets 62 are arranged so that a + pole and a − pole of each phase of the first stator 65 face those of the second stator 68, and magnetic flux generated by the first stator 65 and the second stator 68 passes between the magnets 62.

Figure 8A:
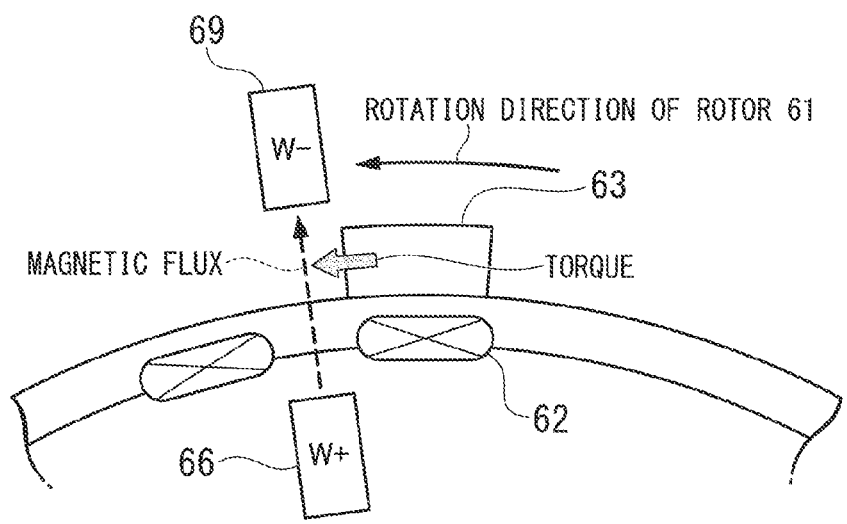
FIG. 8A is a view showing that torque is generated by magnetic flux that passes between magnets.
Figure 8B:
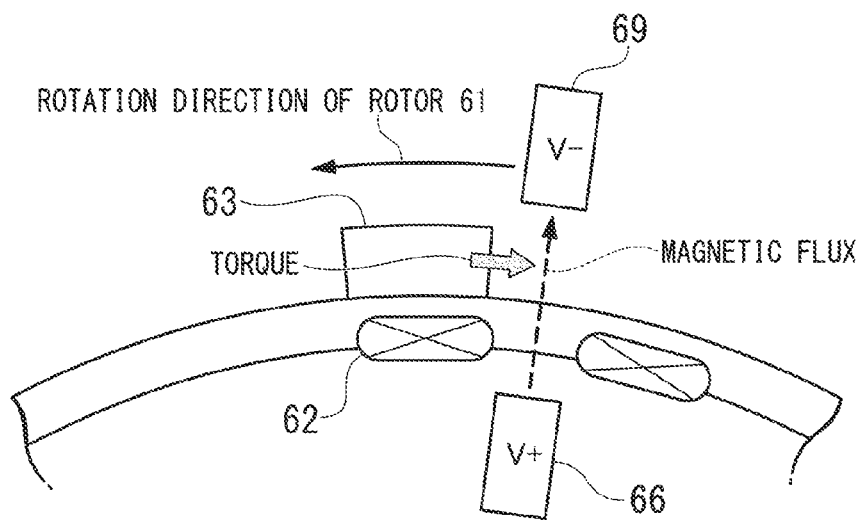
FIG. 8B is a view showing that torque is generated by magnetic flux that passes between the magnets.

This can generate torque more efficiently. In this case, the ACG starter 60 may be used as an electromagnetic brake (regeneration brake), using the magnetic flux and the repulsive force of the magnets 62. FIG. 8A is a view showing that torque is generated by the magnetic flux that passes between the magnets 62. FIG. 8B is a view showing that torque that stops the rotor 61 with the magnetic flux that passes between the magnets 62 is generated. For example, when the throttle grip (deceleration control mechanism) SG is returned to the original position to reduce speed at the time of high-speed operation, or when the brake lever (deceleration control mechanism) BL is operated with a predetermined amount of force or more, the controller 70 generates torque (negative torque) in a direction opposite to the rotation direction of the rotor 61, electromagnetically applies the brake, and performs regenerative power generation. That is, the controller 70 can perform energization of the coils of the second stator 68, thereby generating a negative torque in the rotation direction of the rotor 61 when the deceleration control as described above is performed.

The controller 70 outputs torque for starting the engine 10 to the ACG starter 60, according to a signal input from an ignition switch (not shown). In this case, the controller 70 controls both the switching element group 72 and the switching element group 74, thereby outputting a large torque to the ACG starter 60. Additionally, the controller 70 may perform the same control as that at the time of starting the engine 10 and may generate torque (positive torque) in the same direction as the rotation direction of the rotor 61, even when a strong torque (assistance torque at the time of starting moving) is required for the crankshaft 16, such as at the time of acceleration at low-speed rotation immediately after starting moving of the motorcycle 1 (when the throttle grip (acceleration control mechanism) SG is operated by a predetermined amount or more). That is, the controller 70 can perform energization of the coils of the second stator 68, thereby generating a positive torque in the rotation direction of the rotor 61 when the acceleration control mechanism as described above is operated.

Meanwhile, the controller 70 controls only the switching element group 72 and maintains the entirety of the switching element group 74 in an OFF state when the ACG starter 60 is made to generate electric power and charges the battery 80. Accordingly, the ACG starter 60 can perform power generation with a relatively small amount of power generation, in correspondence to a relationship with the torque output at the time of starting the engine 10. As a result, the relationship between the maximum torque of the ACG starter 60 (generator motor) and the amount of power generation can be made to be excellent.

Here, in starting the engine 10, it is generally known that a relatively large torque is required in order to overcome compression occurring on a top dead center. For this reason, particularly when a large-scale magnet motor capable of generating torque sufficient for starting the engine 10 in which displacement is large is used as the ACG starter, a surplus occurs in the amount of power generation, and friction may tend to increase.

In contrast, according to the ACG starter 60 and the controller 70 (generator motor unit) of the present embodiment, both the switching element group 72 and the switching element group 74 are controlled, and a large torque is output to the ACG starter 60 at the time of starting the engine 10. Additionally, at the time of the power generation of the ACG starter 60, only the switching element group 72 is controlled and the entirety of the switching element group 74 is maintained in an OFF state. Therefore, the maximum torque can be increased, and electric powering can be performed using a moderate amount of power generation. As a result, torque output performance can be improved while limiting an increase in friction.

[Conclusion]

According to the generator motor, the generator motor unit, and the power output engine (the engine 10, the ACG starter 60, the controller 70) of the present embodiment described above, the torque output performance can be improved, while limiting an increase in friction.

In addition, the number of poles of each stator of the ACG starter 60 described above is merely an example, and may be arbitrarily changed according to a situation in which the ACG starter 60 is used.

Third Embodiment

Hereinafter, an ACG starter 90 related to a second embodiment of the invention will be described. In a motorcycle related to the second embodiment, the ACG starter 90 is mounted therein instead of the ACG starter 60, and portions other than this are the same as those of the first embodiment. Therefore, only the structure of the ACG starter 90 will be described herein.

Figure 9:
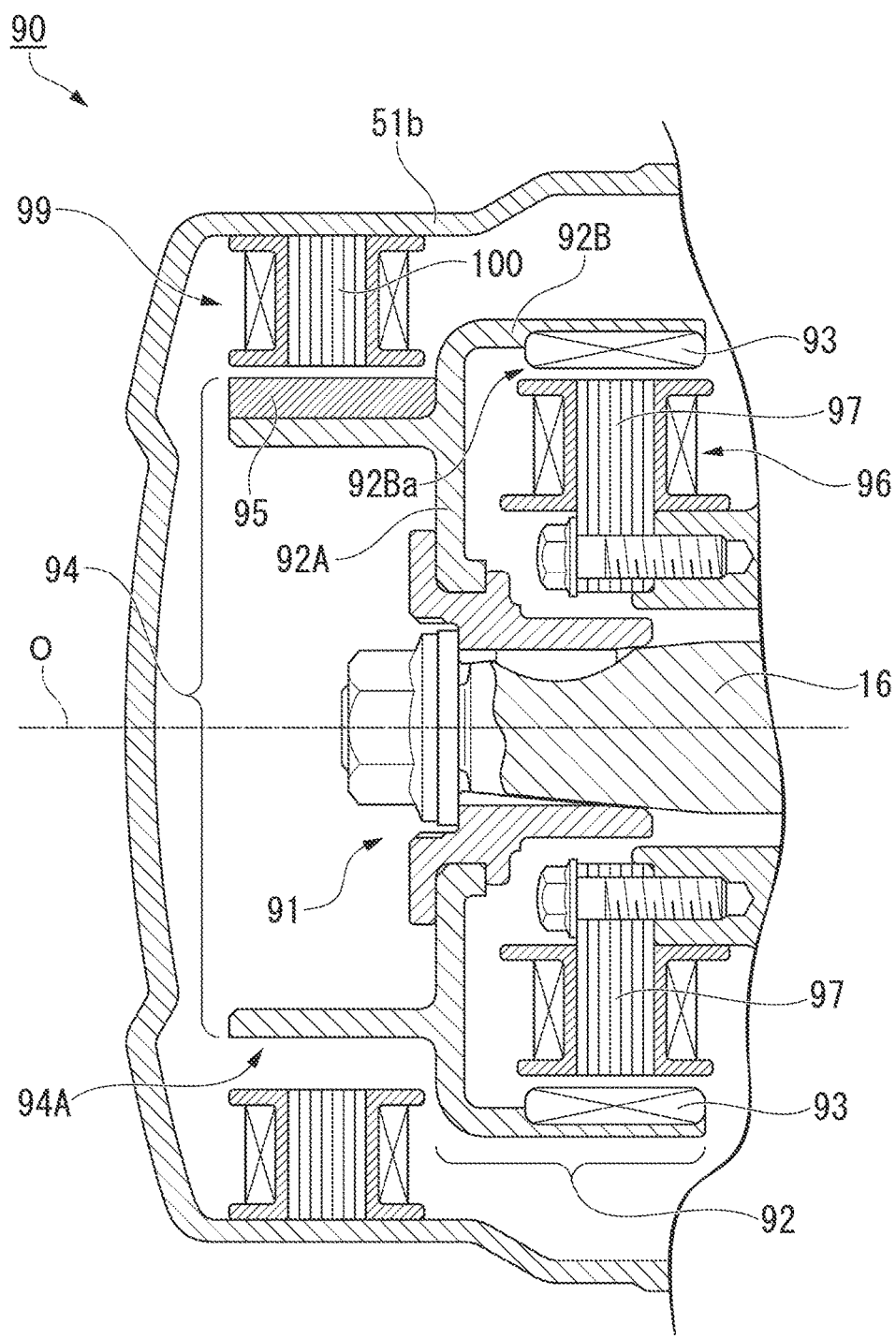
FIG. 9 shows an example of a cross-section of an ACG starter related to a second embodiment.
Figure 10:
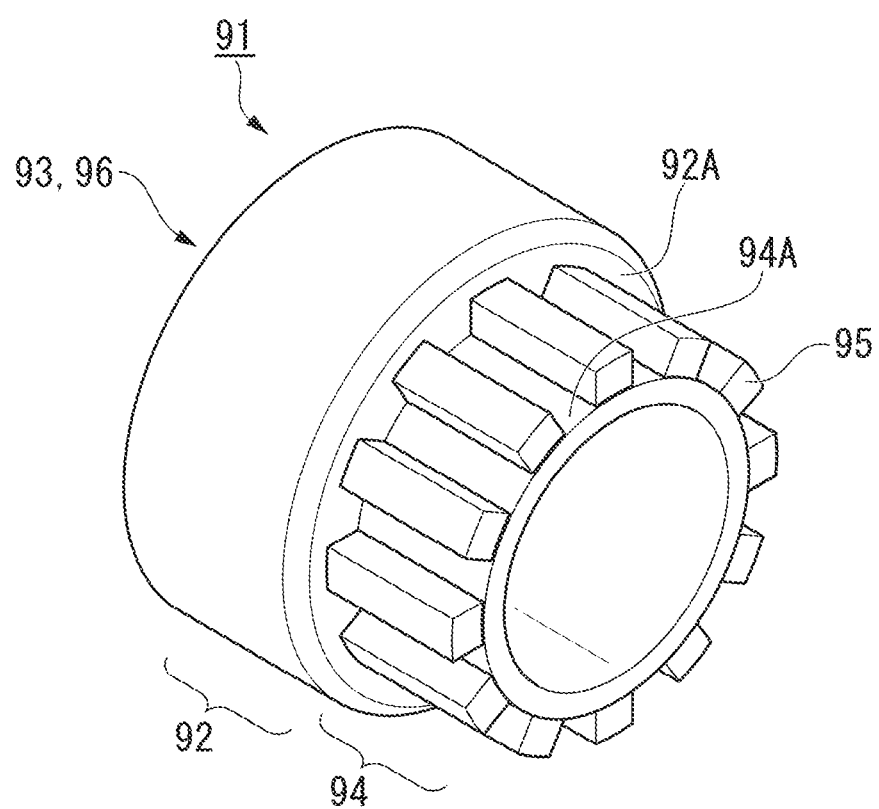
FIG. 10 is a perspective view showing the external shape of a rotor related to the second embodiment.

FIG. 9 shows an example of a cross-section of the ACG starter 90 related to the second embodiment. The ACG starter 90 is equipped with a rotor 91 that rotates integrally with the crankshaft 16, a first stator 96, and a second stator 99. Additionally, FIG. 10 is a perspective view showing the external shape of the rotor 91 related to the second embodiment.

The rotor 91 is equipped with a first cylindrical member 92 and a second cylindrical member 94 that have a substantially cylindrical shape. The second cylindrical member 94 extends in a rotational axis direction (a direction opposite to the engine 10) of the rotor 91 from a bottom wall portion (disk surface) 92A of the first cylindrical member 92.

The first cylindrical member 92 opens on a side opposite to the bottom wall portion 92A, and the crankshaft 16 is introduced through the opening. Magnets 93 are attached to or formed on an inner peripheral surface 92Ba of a side wall portion 92B of the first cylindrical member 92 so as to cover the inner peripheral surface 92Ba. Additionally, magnetic bodies 95 are attached to or formed on an outer peripheral surface 94A of the second cylindrical member 94 so as to protrude outward from the outer peripheral surface 94A (wall surface). The magnetic bodies 95 are provided so as to protrude inward or outward from an outer peripheral surface 94A.

The first stator 96, for example, is coupled to the crankcase 17, and is housed inside the first cylindrical member 92 in a radial direction. The first stator 96 is equipped with a plurality of external-teeth-shaped stator cores 97 that protrude in a direction in which the first cylindrical member 92 is provided and around which coils are wound. The stator cores 97 make magnetic flux, which is generated by performing energization of the coils, act on the magnets 93, thereby generating torque in the rotor 91. Additionally, the first stator 96 generates electric power through the action of electromagnetic induction caused by the rotation of the rotor 91 accompanying the traveling of the motorcycle 1. The electric power generated from the first stator 96 is stored in the battery 80.

The second stator 99, for example, is coupled to the side wall portion 51*b* of the engine cover 51 and is installed outside the second cylindrical member 94 in a radial direction. The second stator 99 is equipped with a plurality of internal-teeth-shaped stator cores 100 that protrude in a direction in which the second cylindrical member 94 is provided and around which coils are wound. The second stator 99 makes magnetic flux, which is generated by performing energization of the coils, act on the magnetic bodies 95, thereby generating torque in the rotor 91.

As shown in FIG. 4 of the first embodiment, the first stator 96 has a structure in which the stator cores 97 have, for example, eighteen poles, and a U pole, a V pole, and W pole are sequentially arranged one by one. The first stator 96 makes magnetic flux act on the magnets 93 arranged at the first cylindrical member 92 through well-known three-phase control, and generates torque in the rotor 91.

Additionally, the second stator 99 has a structure in which the stator cores 100 have, for example, eighteen poles. Three sets of the stator cores 100 are arranged side by side in a circumferential direction in order of a U+ pole, a V+ pole, a W+ pole, a U− pole, a V− pole, and a W− pole. The second stator 99 generates magnetic flux from the U+ pole toward the U− pole, from the V+ pole toward the V− pole, and from the W+ pole toward the W− pole, and makes the magnetic flux act on the magnetic bodies 95, thereby generating torque in the rotor 91.

The controller 70 in the second embodiment, similar to the first embodiment, outputs torque for starting the engine 10 to the ACG starter 60, according to a signal input from an ignition switch (not shown). In this case, the controller 70 controls both the switching element group 72 and the switching element group 74, thereby outputting a large torque to the ACG starter 60.

Additionally, the controller 70 may perform the same control as that at the time of starting the engine 10 and may generate torque (positive torque) in the same direction as the rotation direction of the rotor 61, even when a strong torque (assistance torque at the time of starting moving) is required for the crankshaft 16, such as at the time of acceleration at low-speed rotation immediately after starting moving of the motorcycle 1 (when the throttle grip SG is operated by a predetermined amount or more).

On the other hand, the controller 70 controls only the switching element group 72 and maintains the entirety of the switching element group 74 in an OFF state when the ACG starter 60 is made to generate electric power and charges the battery 80. Accordingly, the ACG starter 60 can perform power generation with a relatively small amount of power generation, in correspondence to a relationship with the torque output at the time of starting the engine 10. As a result, the relationship between the maximum torque of the ACG starter 60 (generator motor) and the amount of power generation can be made to be excellent.

According to the generator motor, the generator motor unit, and the power output engine (the engine 10, the ACG starter 60, the controller 70) of the present embodiment described above, the torque output performance can be improved, while limiting an increase in friction.

Fourth Embodiment

Additionally, in the above embodiments, the first stator of the ACG starter 60 or 90 makes magnetic flux act from the inside of a cylindrical member of the rotor and the second stator makes magnetic flux act from the outside of a cylindrical member. However, this relationship may be reversed. That is, the magnets are attached to or formed on the outer peripheral surface of a cylindrical member of the rotor, the magnetic bodies are attached to or formed on the inner peripheral surface of a cylindrical member, the first stator makes magnetic flux act on the magnets from the outside of the cylindrical member, and the second stator makes magnetic flux act on the magnetic bodies from the inside of the cylindrical member. The magnetic bodies are attached to or formed on the inside of a rotor of a so-called inner rotor type magnet motor, and the second stator is arranged inside the rotor.

Figure 11:
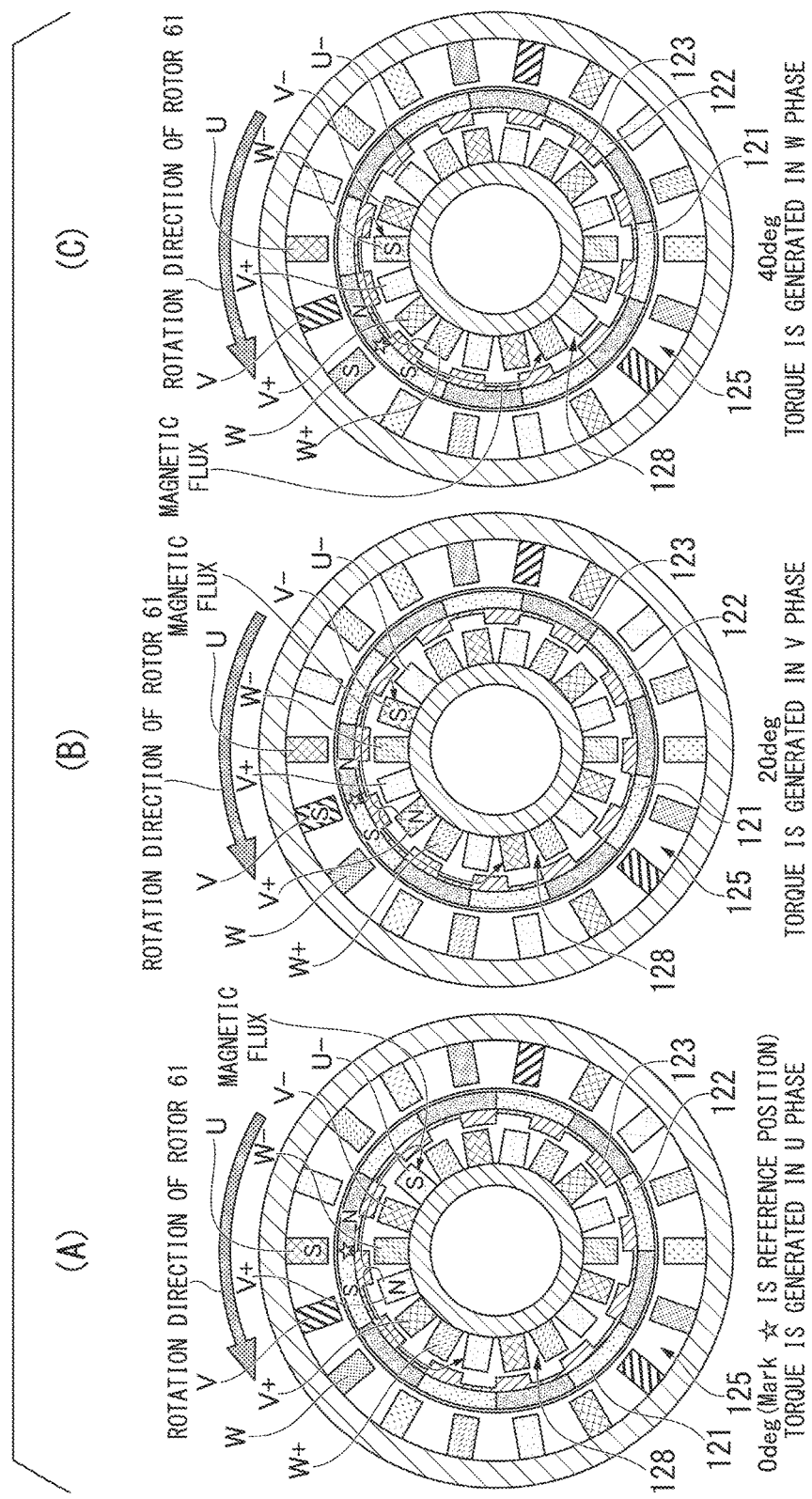
FIG. 11 is a view schematically showing that a rotor is rotationally driven by performing three-phase control of a first stator and a second stator of an ACG starter related to a fourth embodiment.

FIG. 11 is a view schematically showing that a rotor 121 is rotationally driven by performing three-phase control of a first stator 125 and a second stator 128 of an ACG starter 120 related to a fourth embodiment. The ACG starter 120 related to the fourth embodiment is equipped with the rotor (inner rotor) 121 that has magnetic bodies 123 formed on the inside thereof and has magnets 122 attached to or formed on the outside thereof, the first stator 125 that makes magnetic flux act on the magnets 122 from the outside of the rotor 121, thereby generating torque, and the second stator 128 that makes magnetic flux act on the magnetic bodies 123 from the inside of the rotor 121, thereby generating torque.

Modifications

Although the embodiments of the invention have been described as above, the invention is not limited to such embodiments at all, and various modifications and substitutions can be added without departing from the scope of the invention.

For example, vehicles on which the ACG starter 60 or 90 is to be mounted are not limited to the motorcycles of the aspects described in the embodiments, but may be a scooter equipped with a continuously variable transmission, a manual motorcycle, a bicycle with an engine, a light motor vehicle, an ordinary motor vehicle, a large-sized vehicle, or the like.

Additionally, in the above embodiments, the ACG starter 60 or 90 is driven in three phases. However, the ACG starter may be driven in a single phase or in multiple phases.

Additionally, the controller 70 may perform the same control as that at the time of starting the engine 10 even at the time of acceleration at medium-speed to high-speed rotation without being limited to being performed at the time of the acceleration at low-speed rotation immediately after starting moving of the motorcycle 1. Additionally, the controller 70 may make the ACG starter act as the electromagnetic brake even the time of deceleration at low-speed to medium-speed rotation without being limited to being performed at the time of deceleration during the high-speed traveling of the motorcycle 1.

Additionally, a switch capable of being operated by a driver may be included, and when this switch is operated and the throttle grip SG is operated by a predetermined amount or more, torque (positive torque) in the same direction as the rotation direction of the rotor may be generated in the ACG starter.

In addition, the techniques of the above-described first embodiment to fourth embodiment can be suitably combined and used. Additionally, some constituent elements may be omitted.

REFERENCE SIGNS LIST

10: ENGINE (INTERNAL COMBUSTION ENGINE)
16: CRANKSHAFT (ROTATION OUTPUT SHAFT OF INTERNAL COMBUSTION ENGINE)
17: CRANKCASE
51: ENGINE COVER (COVER PORTION)
60, 90: ACG STARTER (GENERATOR MOTOR)
61, 91: ROTOR
62, 93: MAGNET
63, 95: MAGNETIC BODY
65, 96: FIRST STATOR
66, 69, 97, 100: STATOR CORE
68, 99: SECOND STATOR
70: CONTROLLER
72, 74: SWITCHING ELEMENT GROUP (SWITCHING PART)
80: BATTERY
92: FIRST CYLINDRICAL MEMBER
94: SECOND CYLINDRICAL MEMBER

The invention claimed is:

1. A generator motor unit comprising:
  a generator motor including
    a rotor provided with magnets, and magnetic bodies that protrude from a wall surface,
    a first stator that makes magnetic flux act on the magnets, thereby generating torque in the rotor, and
    a second stator that makes magnetic flux act on the magnetic bodies, thereby generating torque in the rotor and that is provided with a switching part capable of stopping energization of coils configured to generate the magnetic flux; and
  a controller that performs energization of coils of the first stator and the second stator so that magnetic flux is generated in the first stator and the second stator when the torque is generated in a rotation direction of the rotor and that performs energization of the coils of the first stator so that magnetic flux is generated in the first stator and stops energization of the coils of the second stator in a state in which the switching part is brought into an OFF state, when electric power is generated by an action of electromagnetic induction caused by a rotation of the rotor.

2. The generator motor unit according to claim 1,
wherein the magnets are arranged at an inner peripheral surface of a substantially cylindrical member in the rotor,
wherein the first stator makes magnetic flux act on the magnets from a radial inward direction of the substantially cylindrical member,
wherein the magnetic bodies are arranged at an outer peripheral surface of the substantially cylindrical member in the rotor, and
wherein the second stator makes magnetic flux act on the magnetic bodies from a radial outward direction of the substantially cylindrical member.

3. The generator motor unit according to claim 2,
wherein the magnets and the magnetic bodies are respectively arranged on an inner peripheral surface and an outer peripheral surface of the same substantially cylindrical member in the rotor.

4. The generator motor unit according to claim 3,
wherein the magnets are arranged at intervals in a circumferential direction of the substantially cylindrical shape, and
wherein the magnetic flux generated by the first stator and the second stator passes between the magnets.

5. The generator motor unit according to claim 1,
wherein the rotor includes a first cylindrical member and a second cylindrical member that have an axis in common,
wherein the magnets are arranged on an inner peripheral surface of one of the first cylindrical member and the second cylindrical member, and
wherein the magnetic bodies are arranged on an outer peripheral surface of the other of the first cylindrical member and the second cylindrical member.

6. The generator motor unit according to claim 1,
wherein the magnets are arranged at an outer peripheral surface of a substantially cylindrical member in the rotor,
wherein the first stator makes magnetic flux act on the magnets from a radial outward direction of the substantially cylindrical member,
wherein the magnetic bodies are arranged at an inner peripheral surface of the substantially cylindrical member in the rotor, and
wherein the second stator makes magnetic flux act on the magnetic bodies from a radial inward direction of the substantially cylindrical member.

7. A power output engine comprising:
the generator motor unit according to claim 1; and
an internal combustion engine that outputs rotational driving power,
wherein the rotor is coupled to a rotation output shaft of the internal combustion engine.

8. The power output engine according to claim 7,
wherein the controller performs energization of coils of the first stator and the second stator so that magnetic flux is generated in the first stator and the second stator when the internal combustion engine is started, and performs energization of the coils of the first stator so that magnetic flux is generated in the first stator and stops energization of the coils of the second stator in a state in which the switching part is brought into an OFF state, when electric power is generated using power output from the internal combustion engine.

9. The power output engine according to claim 7,
wherein the second stator is fixed to a cover portion of the internal combustion engine.

10. The power output engine according to claim 8,
wherein the second stator is fixed to a cover portion of the internal combustion engine.

11. A vehicle comprising:
the power output engine according to claim 7; and
an acceleration control mechanism,
wherein the controller performs energization of the coils of the second stator, thereby generating a positive torque in a rotation direction of the rotor, when the acceleration control mechanism is operated.

12. A vehicle comprising:
the power output engine according to claim 7; and
a deceleration control mechanism,
wherein the controller performs energization of the coils of the second stator, thereby generating a negative torque in a rotation direction of the rotor, when deceleration control mechanism is performed.

13. A vehicle comprising:
the power output engine according to claim 8; and
a deceleration control mechanism,
wherein the controller performs energization of the coils of the second stator, thereby generating a negative torque in a rotation direction of the rotor, when deceleration control mechanism is performed.

* * * * *